Oct. 20, 1970

3,534,596

CONTOUR SURVEYING SYSTEM

Filed Oct. 23, 1967

INVENTORS
COLOSSIE N. BATTS
FREDERICK W. GIBSON
ROBERT W. HESS

BY

ATTORNEYS

INVENTORS
COLOSSIE N. BATTS
FREDERICK W. GIBSON
ROBERT W. HESS
BY
ATTORNEYS

3,534,596
CONTOUR SURVEYING SYSTEM
Colossie N. Batts, Newport News, Frederick W. Gibson, Hampton, and Robert W. Hess, Yorktown, Va., assignors to the United States of America as represented by the Administrator of the National Aeronautics and Space Administration
Filed Oct. 23, 1967, Ser. No. 677,476
Int. Cl. G01b 5/20; G01n 29/00
U.S. Cl. 73—105                        2 Claims

ABSTRACT OF THE DISCLOSURE

This invention is an apparatus for surveying the contour of a surface. An X–Y carriage moves a traveling transducer over the surface to be surveyed, while a shaker moves the surface. A referenced transducer located near the shaker generates a reference signal which is compared with a signal from the traveling transducer. This comparison provides a response phase relationship signal over the vibrating surface and is used to control a reversing means. The signal from the traveling transducer also separately passes through the reversing means. Hence, the reversing means under the comparison control maintains unilateral output polarity. The signal from the traveling transducer after passing through the reversing means is recorded on a digital card punch system and/or on an X–Y plotter. Suitable devices are included for sensing the position of the carriage in both the X and Y directions. The position sensors are utilized with the digital card punch and X–Y plotter systems so that the records obtained can be meaningful interpreted.

---

The invention described herein was made by employees of the U.S. Government and may be manufactured and used by or for the Government for governmental purposes without the payment of any royalties thereon or therefor.

BACKGROUND OF THE INVENTION

Many structural research investigations require the measurement and display of surface amplitudes. Previous methods and apparatus for measuring displacement amplitudes include such means as velocity pickups and accelerometers. These devices are manually positioned and physically fastened to the vibrating structure. Because of this positioning and fastening, these devices are undesirable. Specifically, contact-type transducers, because they are fastened to the structure, are inaccurate because they add mass to the structure under test and because the positioning of the transducers is critical. Further, data acquisition from this type of transducer usually requires at least two persons. In addition, data reduction requires several steps thereby making it rather laborious. Moreover, the determination of mode-shape or surface contours in hostile environments utilizing contact-type transducers is expensive and time-consuming because a large number of transducers are required to adequately describe various surface contour shapes.

In addition to contact-type transducers, the prior art has also utilized non-contact type transducers. Many of these transducers also have the problem of positioning. That is, these transducers require manual movement to various locations. And, this lack of automatic movement, either incremental or continuous, makes these prior art non-contacting systems undesirable.

Therefore, it is an object of this invention to provide a new and improved apparatus for surveying the contour of a surface.

It is also an object of this invention to provide a new and improved system for surveying the contour of a surface with a non-contacting sensor which is automatically movable to positions over the surface.

It is another object of this invention to provide a new and improved system for surveying the contour of a surface wherein the surface can be vibrated and its surface contour changes sensed by a non-contacting transducer movable over the surface at either incremental or constant rates.

SUMMARY OF THE INVENTION

In accordance with a principle of this invention, an apparatus for surveying the contour of a surface is provided. The surface whose contour is to be surveyed may be mounted in a vertical position, for example. A carriage means moves a non-contacting traveling transducer over the surface while a shaker means vibrates the surface. The output from the traveling transducer is electronically compared with the output from a reference transducer located near the shaker means. This comparison generates a reference signal which controls a reversing switch through which the output from the traveling sensor passes. In this manner a unipolar output signal is provided. In addition, a recording and/or plotting means is provided for either recording and/or displaying the output from the traveling transducer.

In accordance with another principle of this invention, both the traveling transducer and the reference transducer signals are recorded on digital punch cards along with signals representing the position of the traveling transducer. Alternatively, the traveling transducer and the position signals are displaced on an X–Y plotter.

In accordance with a further principle of this invention, suitable electronic means are provided for controlling the movement of the traveling sensor over the surface at either incremental or continuous rates.

It will be appreciated by those skilled in the art and others, that the invention is an uncomplicated apparatus for surveying the contour of a surface. The traveling transducer is moved over a surface and its output signal is compared with a reference transducer signal to generate a control signal. The control signal is used to control a reversing means so that the output from the traveling transducer has meaning. Further, means are provided for vibrating the surface and for displaying the contour of the surface. In addition, a means is provide for digitally recording the traveling transducer signals, the referenced transducer signals and the position signals. Moreover, this system can be used to determine with precision, the surface contour of static bodies as well as dynamic bodies.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figures 1, 2:
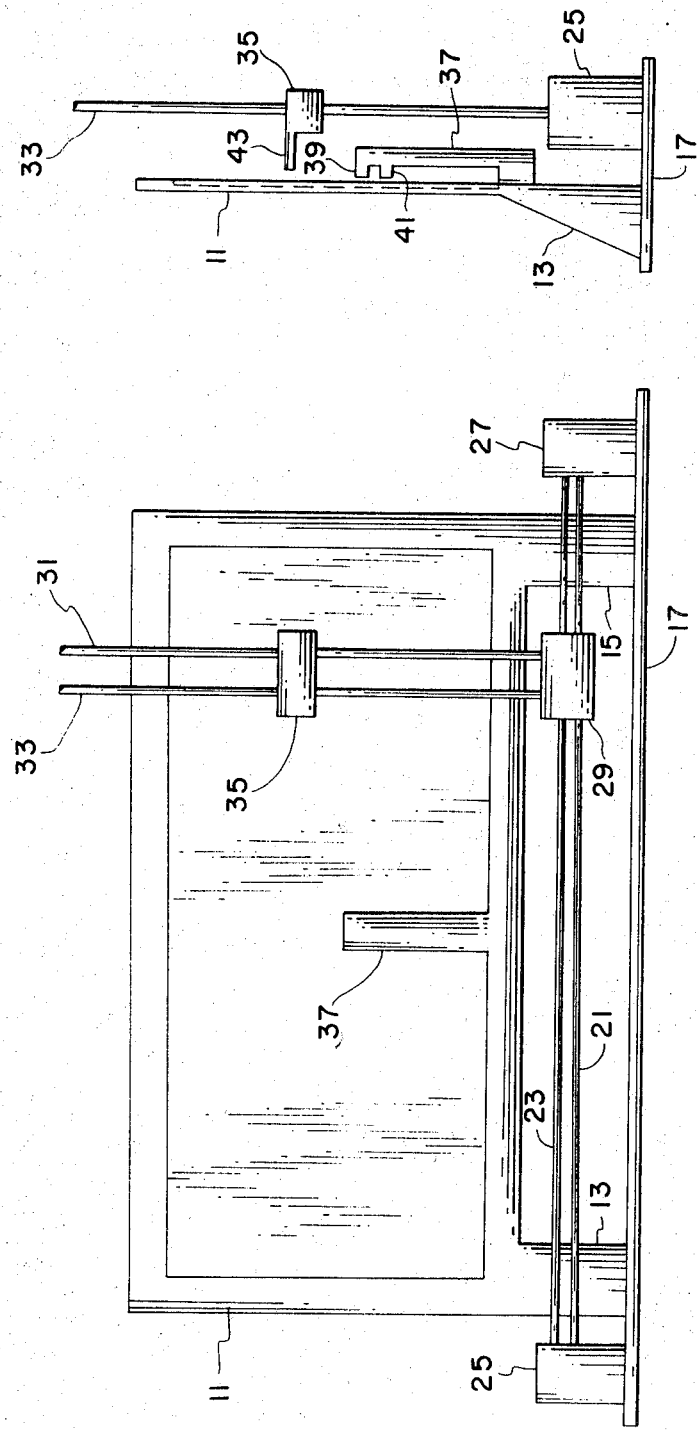
FIG. 1 is a pictorial diagram of the traveling transducer carriage.
FIG. 2 is a side view of FIG. 1.

FIGS. 1 and 2 illustrate an apparatus for supporting a surface whose contour is to be surveyed and an apparatus for moving the traveling transducer over the surface. In addition, an apparatus for vibrating the surface is illustrated. In general, the apparatus for supporting the surface comprises a rectangular frame 11 mounted on a pair of legs 13 and 15. The legs 15 are mounted on a support plate 17.

The traveling transducer moving apparatus includes a pair of parallel horizontal tubular members 21 and 23. The horizontal tubular members are mounted in a pair of end supports 25 and 27. The end supports 25 and 27 are located and mounted on the base 17 so that the tubular members 21 and 23 are parallel to the frame 11. Mounted on the tubular members is a horizontally movable carriage member 29. Projecting upwardly from the horizontally movable carriage member 29 are a pair of vertical tubular members 31 and 33. Mounted on the vertically movable members 31 and 33 is a vertical movable carriage member 35.

The horizontal and vertical carriage members 29 and 35 include suitable means (not shown) for moving them along their respective horizontal and vertical tubular members. For example, each carriage member could include a motor with a gear mounted on the motor's shaft. In addition, one of each pair of tubular members could have teeth along its longitudinal length that co-act with the gear. With this arrangement, the revolving of the motor shaft will move the carriage along its tubular members. Alternatively, one of the tubular members could be a screw that co-acts with a worm gear mounted on a motor shaft. In general, any of numerous well known means can be used to move the carriages along the tubular members.

The vibration or shaking apparatus illustrated in FIGS. 1 and 2 comprises an arm 37 extending upwardly from the bottom of the frame 11. The arm is parallel to one surface of the frame and includes a shaker element 39 which may be a solenoid, for example, and a reference transducer 41. In a conventional manner, the solenoid vibrates the surface when its core contacts the surface. Alternatively, a non-contacting transducer may be used. The referenced transducer, which is fixed, generates a reference signal that varies in accordance with the movement of the surface created by the action of the shaker.

The traveling transducer is illustrated in FIG. 2 as an element 43 projecting from the vertical carriage member 35. Both the traveling and the reference transducers can include various sensing elements. For example, the sensing portion of each transducer can be an inductor or a capacitor. Movement of the surface varies the inductors magnetic field or the capacitors electrostatic field to provide the desired signal change. Alternatively, the sensing means could be an electro-optical system whereby light is reflected by the surface from a lamp to a light sensitive element. Movement of the surface varies the amount of reflected light to vary the output of the light sensitive element. Hence, in general, any of numerous well known non-contacting sensors can be used with the invention.

As hereinafter described, as the horizontal and vertical carriage members 29 and 35 are moved, they move the traveling transducer 43 over the surface in a predetermined manner. This manner may be either continuous or incremental as determined by the hereinafter described electronic control system. Further, the vibrating member 39 can vibrate the surface during movement or between movements.

It will be appreciated that for purposes of simplicity of illustration, only one vibrating arm is illustrated in FIGS. 1 and 2, however, a plurality of such arms (with associated shakers and reference transducers) could be mounted about the frame 11 if desired. Alternatively, the arm could be movably attached to the frame 11 so that it could be moved to various fixed positions. In addition, the arm and shaker could be mounted on the side of the surface opposite to the side illustrated in FIGS. 1 and 2. Hence, the shaker can have numerous locations depending upon what is most advantageous for a particular test or surface.

Figure 3:
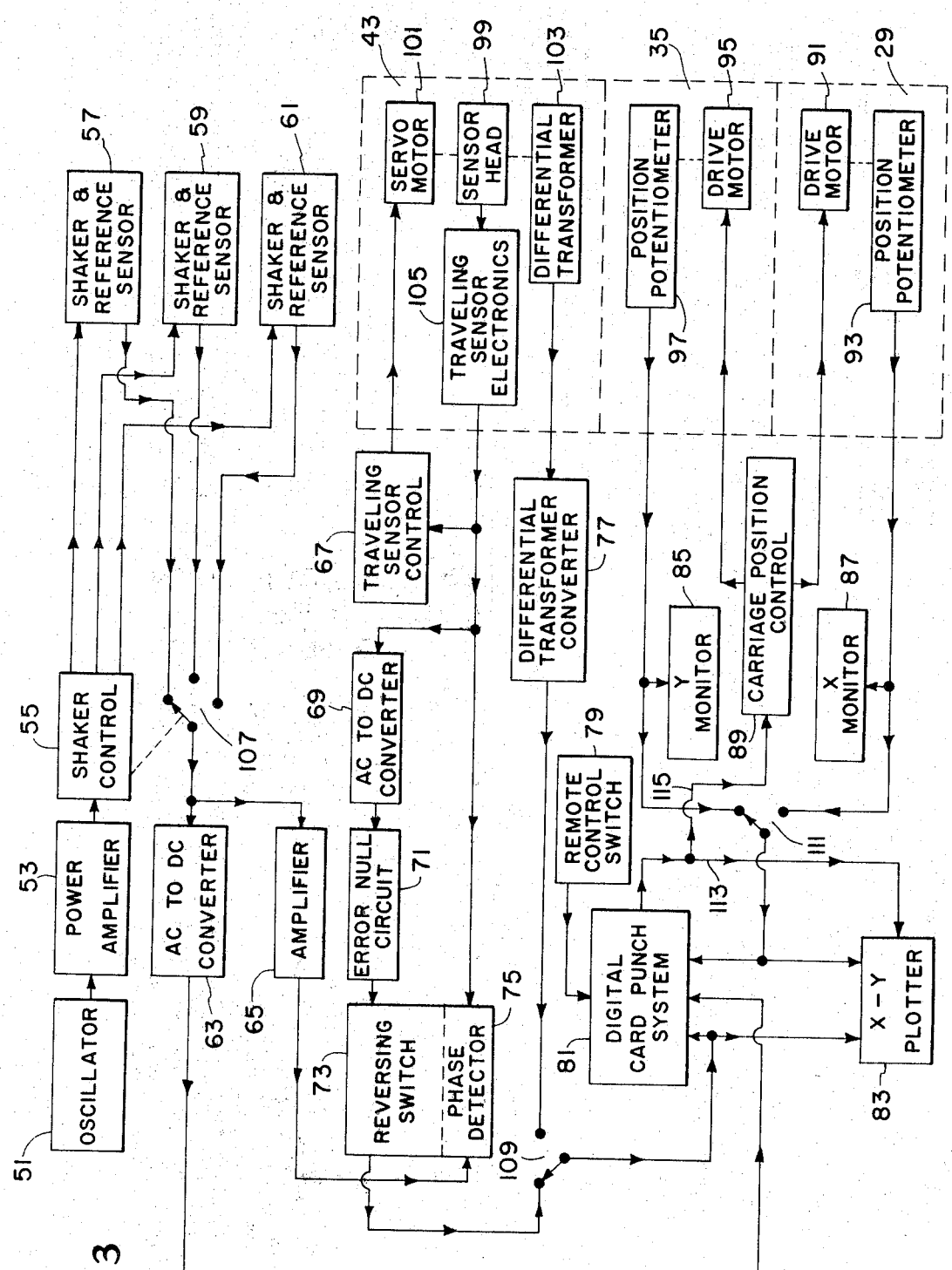
FIG. 3 is a block diagram of the electronic system of the invention.

FIG. 3 illustrates, in block form, an electronic control system suitable for use with the apparatus illustrated in FIGS. 1 and 2. The electronic system illustrated in FIG. 3 comprises an oscillator 51, a power amplifier 53, a shaker control 55, three shakers and reference sensors 57, 59 and 61, a first AC to DC converter 63, an amplifier 65, a traveling sensor control 67, a second AC to DC converter 69, an error null circuit 71, a reversing switch 73, a phase detector 75, a differential transformer converter 77, a remote control switch 79, a digital card punch system 81, an X-Y plotter 83, an X monitor 85, a Y monitor 87, and a carriage position 89.

Also illustrated in FIG. 3 in block form are the horizontal and vertical carriage members 29 and 35, and the traveling transducer 43. The horizontal carriage member 29 includes a drive motor 91 and position potentiometer 93. Similarly, the vertical carriage member includes a drive motor 95 and a position potentiometer 97. The traveling transducer includes a sensor head 99, a servo-drive motor 101, a differential transformer 103, and traveling sensor electronics 105.

The output of the oscillator 51 is connected to the input of the power amplifier 53 and the power of the amplifier is connected to the input of the shaker control 55. The shaker control 55 has three outputs which are separately connected to the shaker inputs of the three shaker and reference sensors 57, 59 and 61. The reference sensor outputs of the three shaker and reference sensors 57, 59 and 61 are connected separately to three terminals of a single-pole, triple-throw switch 107. The connecting element of the single-pole, triple-throw switch is under the control of the shaker control 55 and the common terminal of the switch is connected to the input of the first AC to DC converter 63 and to the input of the amplifier 65.

The output of the first AC to DC converter 63 is connected to an input of the digital card punch system 81. The output of the amplifier 65 is connected to one input of the phase detector 75.

The output of the sensor head 99 of the traveling transducer 43 is connected to the input of the traveling sensor electronics 105. The output of the traveling sensor electronics is connected to the input of the traveling sensor control 67, the input of the second AC to DC converter 69, and the second input of the phase detector 75.

The output of the traveling sensor control 67 is connected to the servo-motor 101 of the traveling sensor 43. In general, the traveling sensor control is adapted to maintain a constant distance between the surface and the sensor head 99 by moving the sensor head toward or away from the surface. This operation is accomplished in a conventional manner by the closed servo-loop system consisting of the sensor head 99, the traveling sensor electronics 105, the traveling sensor control 67, and the servo-motor 101. A more complete description of the operation of this type of sensor movement system is described in the U.S. patent application of Bruce Flagge for a Vibrating Structure Displacement Measuring Instrument, S.N. 582,171.

The output from the AC to DC converter 69 is connected through the error null circuit 71 to the input of the reversing switch 73. The output of the reversing switch 73 is connected to one terminal of a first single-pole double-throw switch 109. The common terminal of the first single-pole, double-throw switch 109 is connected to inputs of the digital card punch system 81 and the X-Y plotter 83.

The output of the differential transformer 103 of the traveling sensor 43 is connected through the differential transformer converter 77 to the second terminal of the first single-pole, double-throw switch 109.

The output of the position potentiometer 93 of the horizontal carriage member 29 is connected to the input of the X monitor 87 and to one terminal of a second single-pole, double-throw switch 111. Similarly, the output of the position potentiometer 97 of the vertical carriage member 35 is connected to the Y monitor 85 and to a second terminal of the second single-pole, double-throw switch 111. The common terminal of the second single-pole, double-throw switch 111 is connected to inputs of the digital card punch system 81 and the X–Y plotter 83.

The remote control switch 79 has an output connected to a control input of the digital card punch system 81, and the digital card punch system 81 has a control input that is connected to the X–Y plotter 83 and to the input of the carriage position control 89 by conductors 113 and 115, respectively. The output of the carriage position control 89 is connected to the drive motor 91 of the horizontal carriage member 29 and the drive motor 95 of the vertical carriage member 35.

In operation, the shakers of the three shaker and reference sensors 57, 59 and 61 of FIG. 3 are selectively energized by the shaker control; that is, one of the three is energized to form the single shaker illustrated in FIGS. 1 and 2. And, the first switch 107 is positioned to pass a signal from a reference sensor. This signal passes through the first AC to DC converter and is recorded as a variable DC signal by the digital card punch system.

The remote control switch 79 energizes the movement mechanism of the traveling sensor. Switches located on the carriage position control 89 determine the mode of movement—continuous or incremental. If incremental, the increment may be varied over a range from 0.1 to 9.9 inches, for example. More specifically, the remote control switch's output passes through the digital card punch system and energizes the carriage position control. The carriage position control upon being energized by the remote control switch 79 energizes the drive motors 91 and 95 of the horizontal and vertical carriage members 29 and 35. These drive motors selectively move the horizontal and vertical carriages in either a continuous or incremental manner.

As the traveling transducer is moved over the surface, its sensor head 99 generates signals that are amplified and filtered by the traveling sensor electronics 105.

As the DC output of the traveling sensor electronics varies, the DC input to the traveling sensor control varies. As the DC input to the traveling sensor control varies, it varies the electrical energy applied to the servo motor 101. In this manner, as hereinabove described, the distance between the sensor head 99 of the traveling transducer 43 and the surface is maintained constant. The AC output of the traveling sensor electronics is compared with the AC output from the reference sensor in the phase detector 75 to provide a response phase relationship over the vibrating surface. The phase detector can, for example, be a ring demodulator wherein the output of the demodulator is positive when its input signals are in phase, and negative when they are out of phase. The phase detector's output is used to control the reversing switch which, for example, could be an optical meter-type relay that reverses polarity in accordance with the output of the ring demodulator (phase detector). Hence, the output from the AC to DC converter 69 after passing through the error null circuit is reversed in polarity when there is 180° phase shift between the reference sensor AC output and the traveling sensor AC output.

The error null circuit merely eliminates error caused by electronic noise. The circuit provides a DC voltage that is equal in amplitude and opposite in polarity to any constant electronic noise signals.

The output from the reversing switch 73 is displayed on the X–Y plotter and/or recorded on the digital cards of the digital card punch system. In addition, the output from either the X or the Y position potentiometer after passing through the second single-pole, double-throw switch 111 is recorded on the digital card punch system 81. These signals also control one axis movement of the X–Y plotter 83.

If it is desired to display a signal representing the distance between the sensor head and the surface, the first double-pole, single-throw switch is positioned so that the output from the differential transformer converter 77 is recorded by the digital card punch system or displayed on the X–Y plotter. This operation is normally used to adjust the overall system so that the sensor head 99 is a precise distance from the surface at any point as it is moved over the surface.

In the incremental mode of operation, the data outputs representing position along one axis, amplitude of the signal from the traveling transducer sensor head, and amplitude of the signal from the reference sensor, may be recorded on digital punch cards. Simultaneously, the signal from the traveling sensor and the signal from one positon potentiometer may be plotted on the X–Y plotter for visual reference. Preferably, during incremental operation, the movement of the carriage from point to point and the acquisition of data at a point are interdependent. That is, the data is recorded after movement. And, after data has been recorded, the carriage moves automatically to the next point so that data can be recorded for that point. In the continuous mode of operation, the surface amplitude is plotted as a function of a co-ordinate amplitude on the X–Y plotter. Also, if desired, a high speed computer could be substituted for the digital card punch system to continuously record the data.

It will be appreciated, that the invention has numerous advantages over the prior art. Because it is remotely controlled, it permits measurement of surface contours in hostile environments. Further, it has superior accuracy over prior art devices because distortion is minimized. That is, distortion is minimized because the sensing head does not touch the surface. And, due to the high sensitivity of the system, the shakers can excite the structure at very low amplitudes. In addition, errors due to manual reading and recording of data are eliminated. Moreover, the traveling sensor amplitude signal and the reference amplitude signal are recorded virtually simultaneously, thus reducing the possibility of errors which could be caused by a time-varying change in the amplitude of vibration. And, the automatic coordinate positioning of the traveling sensor head is more accurate than prior art manual positioning systems.

It will be appreciated by those skilled in the art and others, that the foregoing description of the preferred embodiment of the invention can be modified and changed within the scope of the inventive concept. Specifically, other servo controlled apparatus for automatically moving the traveling transducer over a surface whose contour is to be sensed can be used. In addition, while the drawings have only illustrated the movement of the device over a flat surface, the invention can also be utilized with non-planar surfaces. Hence, the invention can be practiced otherwise than as specifically described herein.

What is claimed is:

1. Apparatus for surveying the contour of a surface comprising:
    shaker means mounted adjacent to said surface for shaking said surface;
    reference transducer means mounted near said shaker means and responsive to the shaking of said surface for generating a first alternating current signal related to the shaking of said surface adjacent to said reference transducer;
    a traveling transducer for generating a second alternating current signal related to the shaking of said surface adjacent to said traveling transducer;
    carriage means for moving said traveling transducer over said surface;
    means for positioning said carriage means;
    means for converting said second alternating current signal into a direct current signal;
    digital recording means; and
    means for comparing the phases of said first and second alternating current signals; and means responsive to said comparing means for applying said direct current signal to said digital recording means when the two alternating current signals are in phase and for changing the polarity of said direct current signal and applying it to said digital recording means when the two alternating current signals are out of phase whereby the resulting recording is a measurement of the mode shapes of said surface.

2. Apparatus according to claim 1 wherein said positioning means includes means for moving said traveling transducer in either of two perpendicular directions.

References Cited

UNITED STATES PATENTS

| | | | |
|---|---|---|---|
| 2,989,864 | 6/1961 | Bamford | 73—67.8 |
| 3,015,948 | 6/1962 | Kearns | 73—67.2 |
| 3,180,136 | 4/1965 | Foster | 73—71.4 |
| 3,187,565 | 6/1965 | Kreiskorte et al. | 73—67.3 |
| 3,188,859 | 6/1965 | Greenberg et al. | 73—71.5 |
| 3,209,582 | 10/1965 | Greenberg et al. | 73—67.8 |

RICHARD C. QUEISSER, Primary Examiner

E. J. KOCH, Assistant Examiner

U.S. Cl. X.R.

73—71.6